(12) United States Patent
Hamama et al.

(10) Patent No.: US 8,855,894 B2
(45) Date of Patent: Oct. 7, 2014

(54) EXHAUST TEMPERATURE AND PRESSURE MODELING SYSTEMS AND METHODS

(75) Inventors: Wajdi B. Hamama, Whitmore Lake, MI (US); Jaehak Jung, Pittsford, NY (US); Jon C. Miller, Fenton, MI (US); Gregory J. York, Fenton, MI (US); David N. Belton, Birmingham, MI (US); J. Michael Ellenberger, Huntington Woods, MI (US); Louis A. Avallone, Milford, MI (US); Wenbo Wang, Novi, MI (US)

(73) Assignee: GM Global Technology Operations LLC

( * ) Notice: Subject to any disclaimer, the term of this patent is extended or adjusted under 35 U.S.C. 154(b) by 1692 days.

(21) Appl. No.: 12/316,022

(22) Filed: Dec. 9, 2008

(65) Prior Publication Data

US 2010/0107630 A1 May 6, 2010

Related U.S. Application Data

(60) Provisional application No. 61/111,073, filed on Nov. 4, 2008.

(51) Int. Cl.
| | |
|---|---|
| *B60T 7/12* | (2006.01) |
| *F02D 41/14* | (2006.01) |
| *F02D 41/02* | (2006.01) |
| *F02B 37/00* | (2006.01) |
| *F02D 41/00* | (2006.01) |
| *F01N 13/10* | (2010.01) |
| *F01N 13/02* | (2010.01) |

(52) U.S. Cl.
CPC ........... *F02D 41/0007* (2013.01); *F01N 13/107* (2013.01); *F02D 41/1447* (2013.01); *F02D 41/0235* (2013.01); *F02B 37/001* (2013.01); *F02B 37/004* (2013.01); *F01N 13/02* (2013.01); *F02D 41/1445* (2013.01); *F02D 41/145* (2013.01); *Y02T 10/144* (2013.01)
USPC .................. 701/108; 123/568.21; 123/568.23

(58) Field of Classification Search
USPC ................ 701/101, 108; 123/568.21, 568.22, 123/568.26
See application file for complete search history.

(56) References Cited

U.S. PATENT DOCUMENTS

| | | | | |
|---|---|---|---|---|
| 4,594,668 | A | * | 6/1986 | Fujawa et al. .................. 701/100 |
| 5,050,376 | A | * | 9/1991 | Stiglic et al. .................... 60/274 |

(Continued)

FOREIGN PATENT DOCUMENTS

| | | |
|---|---|---|
| DE | 19964013 | 7/2001 |
| DE | 102004009646 A1 | 9/2004 |

(Continued)

OTHER PUBLICATIONS

Office Action dated Apr. 20, 2012, from the German Patent Office for German Patent Application No. 10 2009 051 475.9; 7 pages.

(Continued)

*Primary Examiner* — John Kwon

(57) ABSTRACT

An exhaust control system for a vehicle comprises an exhaust system modeling module and an actuator control module. The exhaust system modeling module estimates an input gas temperature, an output gas temperature, a mass temperature, and a pressure for an exhaust system component of an exhaust system implemented in the vehicle. Exhaust gas flows through the exhaust system component. The actuator control module selectively adjusts an engine operating parameter based on at least one of the input gas temperature, the output gas temperature, the mass temperature, and the pressure.

23 Claims, 7 Drawing Sheets

(56) References Cited

U.S. PATENT DOCUMENTS

| | | | |
|---|---|---|---|
| 5,761,902 A * | 6/1998 | Usami et al. | 60/288 |
| 5,931,140 A * | 8/1999 | Maloney | 123/480 |
| 6,226,981 B1 * | 5/2001 | Bruch et al. | 60/274 |
| 6,247,311 B1 * | 6/2001 | Itoyama et al. | 60/602 |
| 6,360,541 B2 * | 3/2002 | Waszkiewicz et al. | 60/605.2 |
| 7,848,872 B2 * | 12/2010 | Ma et al. | 701/108 |
| 2002/0108603 A1 * | 8/2002 | Wienand et al. | 123/478 |
| 2003/0101974 A1 * | 6/2003 | Wienand et al. | 123/568.12 |
| 2004/0230366 A1 | 11/2004 | Ueda et al. | |
| 2005/0096833 A1 * | 5/2005 | Nakazawa | 701/102 |
| 2005/0242760 A1 * | 11/2005 | Fujita et al. | 318/434 |
| 2008/0082289 A1 * | 4/2008 | Barrillon et al. | 702/130 |
| 2008/0216557 A1 * | 9/2008 | Wang et al. | 73/23.31 |

FOREIGN PATENT DOCUMENTS

| | | |
|---|---|---|
| DE | 102004043365 A1 | 3/2006 |
| DE | 102204043365 | 3/2006 |
| DE | 102006007417 A1 | 8/2007 |
| EP | 1698776 | 9/2006 |

OTHER PUBLICATIONS

Office Action dated Dec. 14, 2012 from the German Patent Office for German Patent Application No. 10 2011 110 745.6, 7 pages.

\* cited by examiner

US 8,855,894 B2

EXHAUST TEMPERATURE AND PRESSURE MODELING SYSTEMS AND METHODS

CROSS-REFERENCE TO RELATED APPLICATIONS

This application claims the benefit of U.S. Provisional Application No. 61/111,073, filed on Nov. 4, 2008. The disclosure of the above application is incorporated herein by reference.

FIELD

The present disclosure relates to internal combustion engine systems and more particularly to exhaust systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts a mixture of air and fuel to produce drive torque and propel a vehicle. Air is drawn into the engine through a throttle valve. Fuel provided by one or more fuel injectors mixes with the air to form the air/fuel mixture. The air/fuel mixture is combusted within one or more cylinders to produce drive torque. An engine control module (ECM) controls the torque output of the engine.

Exhaust gas resulting from combustion of the air/fuel mixture is expelled from the engine to an exhaust system. The ECM may adjust one or more engine parameters based on signals from various sensors that are located in the exhaust system. For example only, one or more temperature sensors and/or exhaust flow rate sensors may be located in the exhaust system. The ECM may adjust, for example, airflow into the engine, the amount of fuel injected, and/or spark timing based on the signals.

The sensors provide the ECM with measurements regarding conditions within the exhaust system and allow the ECM to adjust one or more engine parameters to create desired exhaust conditions. As the number of sensors implemented in the exhaust system increases, however, the cost of producing the vehicle also increases. The increased production cost may be attributable to, for example, the sensors themselves, associated wiring and hardware, and/or research and development. Additionally, a vehicle producer may produce a variety of different vehicles, and each of the different vehicles may have a different exhaust system. Calibrating and adjusting sensors implemented in each different vehicle and exhaust system may also increase vehicle production cost.

SUMMARY

An exhaust control system for a vehicle comprises an exhaust system modeling module and an actuator control module. The exhaust system modeling module estimates an input gas temperature, an output gas temperature, a mass temperature, and a pressure for an exhaust system component of an exhaust system implemented in the vehicle. Exhaust gas flows through the exhaust system component. The actuator control module selectively adjusts an engine operating parameter based on at least one of the input gas temperature, the output gas temperature, the mass temperature, and the pressure.

In other features, the exhaust system modeling module estimates the input gas temperature based on a second output gas temperature that is estimated for a second exhaust system component that is linked to and located upstream from the exhaust system component.

In still other features, the exhaust system modeling module estimates an engine output temperature and estimates the input gas temperature based on the engine output temperature when the exhaust system component is an exhaust manifold.

In further features, the exhaust system modeling module estimates the engine output temperature based on engine load, air-per-cylinder, spark timing, equivalence ratio, ethanol concentration of fuel, engine speed, and vehicle speed.

In still further features, the exhaust system modeling module estimates a gas temperature at a location where an exhaust gas recirculation (EGR) system is connected to an exhaust manifold and estimates the input gas temperature based on the gas temperature when the exhaust system component is an EGR system.

In other features, the exhaust system modeling module estimates a steady-state (SS) temperature for the exhaust system component and estimates the mass temperature based on the SS temperature and a mass coefficient determined for the exhaust system component.

In still other features, the mass coefficient is determined based on an exhaust gas flowrate (EGF) estimated for the exhaust system component.

In further features, the exhaust system modeling module estimates the SS temperature based on ambient air temperature, the input gas temperature, and the EGF.

In still further features, the exhaust system modeling module estimates the SS temperature further based on an intake air temperature and a duty cycle of power applied to a bypass when the exhaust system component is a turbocharger.

In other features, the exhaust system modeling module estimates heat generation when the exhaust system component is a catalyst and selectively increases at least one of the mass temperature and the SS temperature based on the heat generation.

In still other features, the exhaust system modeling module estimates the output gas temperature based on the input gas temperature, the mass temperature, and an output coefficient determined for the exhaust system component.

In further features, the output coefficient is determined based on an exhaust gas flowrate (EGF) estimated for the exhaust system component.

In still further features, the exhaust system modeling module estimates heat generation when the exhaust system component is a catalyst and selectively increases the output gas temperature based on the heat generation.

In other features, the output coefficient is determined further based on a duty cycle of power applied to a bypass when the exhaust system component is a turbocharger.

In still other features, the exhaust system modeling module estimates the pressure based on a sum of a pressure increase estimated for the exhaust system component and a second pressure downstream of the pressure.

In further features, the exhaust system modeling module estimates the pressure increase based on an exhaust gas flowrate (EGF) estimated for the exhaust system component.

In still further features, the exhaust system modeling module estimates the pressure increase further based on a duty cycle of power applied to a bypass when the exhaust system component is a turbocharger.

In other features, the second pressure is ambient air pressure when the exhaust system component is a muffler/tailpipe system.

In still other features, the exhaust control system further comprises a configuration module. The configuration module receives configuration data corresponding to a configuration of the exhaust system and configures the exhaust system modeling module based on the configuration data.

In further features, the exhaust system modeling module is initially configured based on a generic exhaust system configuration including two exhaust manifolds, an exhaust gas recirculation (EGR) system, four turbochargers, six exhaust pipe sections, six catalysts, and two muffler/tailpipe systems.

In still further features, the exhaust system modeling module selectively disables one or more components of the generic exhaust system configuration based on the configuration data.

In other features, the exhaust system modeling module estimates N input gas temperatures, output gas temperatures, mass temperatures, and pressures for respective ones of N different exhaust system components including the exhaust system component. N is an integer greater than one, and the exhaust gas flows through each of the N different exhaust system components.

In still other features, the exhaust system includes a total of the N different exhaust system components.

An exhaust control method for a vehicle comprises: estimating an input gas temperature, an output gas temperature, a mass temperature, and a pressure for an exhaust system component of an exhaust system implemented in the vehicle; and selectively adjusting an engine operating parameter based on at least one of the input gas temperature, the output gas temperature, the mass temperature, and the pressure. Exhaust gas flows through the exhaust system component.

In other features, the exhaust control method further comprises estimating the input gas temperature based on a second output gas temperature that is estimated for a second exhaust system component that is linked to and located upstream from the exhaust system component.

In still other features, the exhaust control method further comprises estimating an engine output temperature and estimating the input gas temperature based on the engine output temperature when the exhaust system component is an exhaust manifold.

In further features, the exhaust control method further comprises estimating the engine output temperature based on engine load, air-per-cylinder, spark timing, equivalence ratio, ethanol concentration of fuel, engine speed, and vehicle speed.

In still further features, the exhaust control method further comprises estimating a gas temperature at a location where an exhaust gas recirculation (EGR) system is connected to an exhaust manifold and estimating the input gas temperature based on the gas temperature when the exhaust system component is an EGR system.

In other features, the exhaust control method further comprises estimating a steady-state (SS) temperature for the exhaust system component and estimating the mass temperature based on the SS temperature and a mass coefficient determined for the exhaust system component.

In still other features, the mass coefficient is determined based on an exhaust gas flowrate (EGF) estimated for the exhaust system component.

In further features, the exhaust control method further comprises estimating the SS temperature based on ambient air temperature, the input gas temperature, and the EGF.

In still further features, the exhaust control method further comprises estimating the SS temperature further based on an intake air temperature and a duty cycle of power applied to a bypass when the exhaust system component is a turbocharger.

In other features, the exhaust control method further comprises estimating heat generation when the exhaust system component is a catalyst and selectively increasing at least one of the mass temperature and the SS temperature based on the heat generation.

In still other features, the exhaust control method further comprises estimating the output gas temperature based on the input gas temperature, the mass temperature, and an output coefficient determined for the exhaust system component.

In further features, the output coefficient is determined based on an exhaust gas flowrate (EGF) estimated for the exhaust system component.

In still further features, the exhaust control method further comprises estimating heat generation when the exhaust system component is a catalyst and selectively increasing the output gas temperature based on the heat generation.

In other features, the output coefficient is determined further based on a duty cycle of power applied to a bypass when the exhaust system component is a turbocharger.

In still other features, the exhaust control method further comprises estimating the pressure based on a sum of a pressure increase estimated for the exhaust system component and a second pressure downstream of the pressure.

In further features, the exhaust control method further comprises estimating the pressure increase based on an exhaust gas flowrate (EGF) estimated for the exhaust system component.

In still further features, the exhaust control method further comprises estimating the pressure increase further based on a duty cycle of power applied to a bypass when the exhaust system component is a turbocharger.

In other features, the second pressure is ambient air pressure when the exhaust system component is a muffler/tailpipe system.

In still other features, the exhaust control method further comprises: estimating the input gas temperature, the output gas temperature, the mass temperature, and the pressure using an exhaust system modeling module; receiving configuration data corresponding to a configuration of the exhaust system; and configuring the exhaust system modeling module based on the configuration data.

In further features, the exhaust system modeling module is initially configured based on a generic exhaust system configuration including two exhaust manifolds, an exhaust gas recirculation (EGR) system, four turbochargers, six exhaust pipe sections, six catalysts, and two muffler/tailpipe systems.

In still further features, the exhaust control method further comprises selectively disabling one or more components of the generic exhaust system configuration based on the configuration data.

In other features, the exhaust control method further comprises estimating N input gas temperatures, output gas temperatures, mass temperatures, and pressures for respective ones of N different exhaust system components including the exhaust system component. N is an integer greater than one and the exhaust gas flows through each of the N different exhaust system components.

In still other features, the exhaust system includes a total of the N different exhaust system components.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
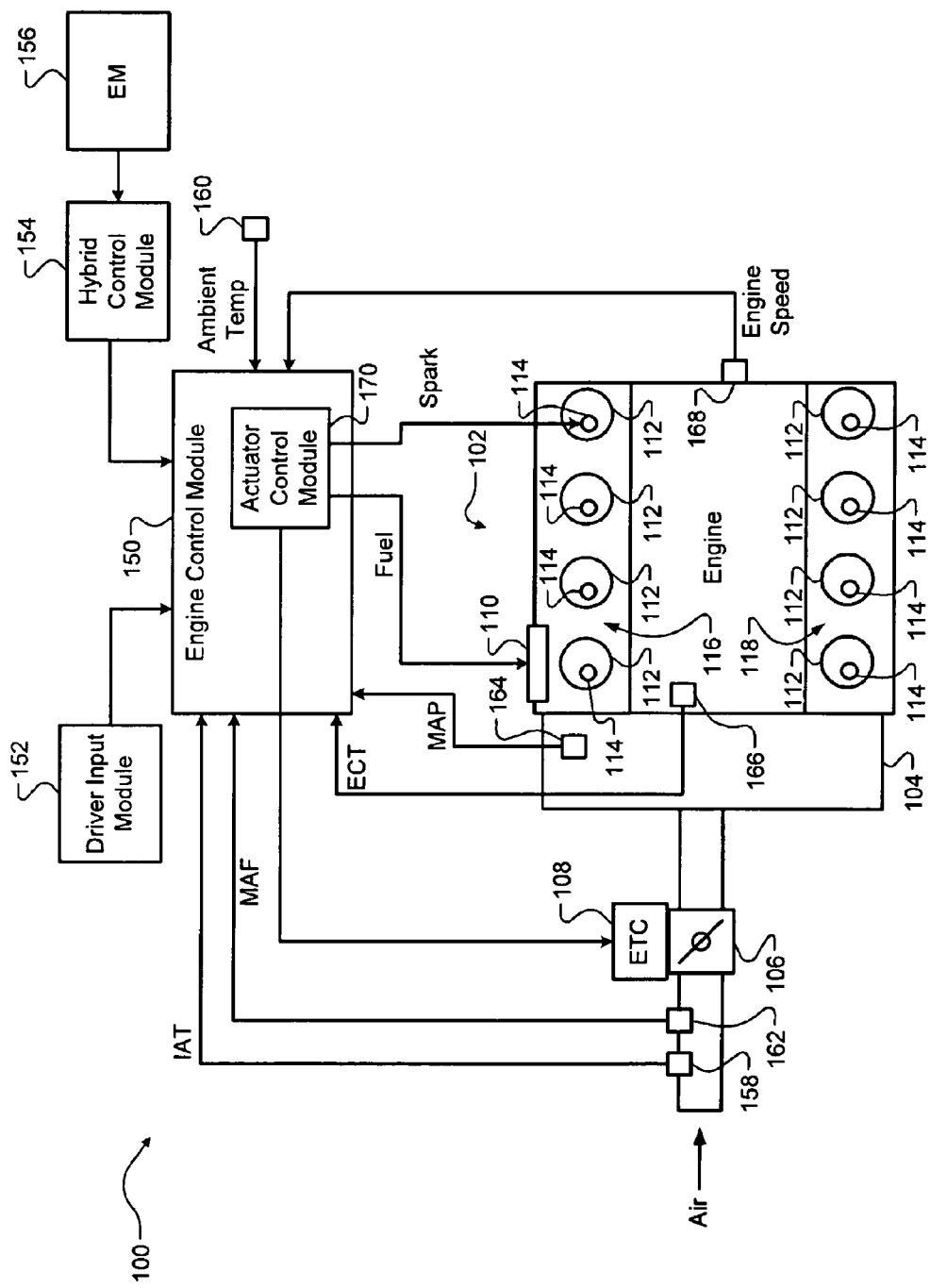
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An exhaust system of a vehicle includes exhaust system components through which exhaust flows before the exhaust is expelled from the vehicle. An exhaust system modeling module according to the present disclosure estimates (i.e., models) input gas temperature, output gas temperature, mass temperature, and pressure for one or more of the exhaust system components through which the exhaust flows.

The input and output gas temperatures of an exhaust system component correspond to temperatures of exhaust gas entering and exiting the component, respectively. The mass temperature corresponds to the temperature of the material that makes up the component. Modeling temperature and pressure at various locations in the exhaust system allows an engine controller to adjust engine operating parameters to provide desired conditions in the exhaust system.

Referring now to FIG. 1, a functional block diagram of an exemplary implementation of an engine system 100 is presented. An air/fuel mixture is combusted within an engine 102 to produce drive torque for a vehicle. The engine 102 may be a gasoline-type engine, a diesel-type engine, a hybrid-type engine, and/or another suitable type of engine. The engine 102 may be configured in any suitable configuration. For example only, the engine 102 may be configured in a V-type configuration, a flat-type configuration, or an inline-type configuration.

Air is drawn into the engine 102 through an intake manifold 104 and a throttle valve 106. The throttle valve 106 is actuated to control airflow into the engine 102. An electronic throttle controller (ETC) 108 controls the throttle valve 106 and, therefore, airflow into the engine 102.

A fuel system 110 injects fuel that mixes with the air to form the air/fuel mixture. The fuel system 110 may inject the fuel at any suitable location. For example only, the fuel system 110 may provide fuel into the intake manifold 104, into intake valves (not shown) associated with cylinders 112 of the engine 102, and/or directly into each of the cylinders 112. In various implementations, the fuel system 110 includes one fuel injector (not shown) for each of the cylinders 112.

The air/fuel mixture is combusted within the cylinders 112 of the engine 102. Combustion of the air/fuel mixture may be initiated by, for example, spark provided by spark plugs 114. In some engine systems, such as the engine system 100, one spark plug may be provided for each of the cylinders 112. In other engine systems, such as diesel-type engine systems, combustion may be accomplished without the spark plugs 114. Combustion of the air/fuel mixture generates drive torque and rotatably drives a crankshaft (not shown).

The engine 102 may include eight cylinders as shown in FIG. 1, although the engine 102 may include a greater or fewer number of cylinders. The cylinders 112 of the engine 102 are depicted as being arranged in two cylinder banks: a left cylinder bank 116 and a right cylinder bank 118. Although the engine 102 is shown as including the left and right cylinder banks 116 and 118, the engine 102 may include fewer or more cylinder banks. For example only, inline-type engines may be considered to have cylinders arranged in one cylinder bank.

An engine control module (ECM) 150 controls the torque output of the engine 102. The ECM 150 may control the torque output of the engine 102 based on driver inputs provided by a driver input module 152. For example only, the driver inputs may include an accelerator pedal position.

The ECM 150 may also communicate with a hybrid control module 154 to coordinate operation of the engine 102 and one or more electric motors, such as electric motor (EM) 156. The EM 156 may also function as a generator, and may be used to selectively produce electrical energy for use by vehicle electrical systems and/or for storage in a battery.

The ECM 150 makes control decisions based on parameters measured by various sensors. For example, intake air temperature may be measured using an intake air temperature (IAT) sensor 158. Ambient air temperature may be measured using an ambient temperature sensor 160. Mass flow rate of air into the engine 102 may be measured using a mass airflow (MAF) sensor 162. Pressure within the intake manifold 104 may be measured using a manifold absolute pressure (MAP) sensor 164. In various implementations, engine vacuum may be measured, where engine vacuum is determined based on the difference between ambient air pressure and the pressure within the intake manifold 104.

Coolant temperature may be measured using a coolant temperature sensor 166. The coolant temperature sensor 166 may be located within the engine 102 or at other locations where the coolant is circulated, such as a radiator (not shown). Engine speed may be measured using an engine speed sensor 168. For example only, the engine speed may be measured based on the rotational speed of the crankshaft.

The ECM 150 may include an actuator control module 170 that controls engine operating parameters. For example only, the actuator control module 170 may adjust throttle opening, amount or timing of fuel injection, spark timing, cylinder deactivation, and/or turbocharger boost. The actuator control module 170 may also control other engine parameters, such as exhaust gas recirculation (EGR) valve opening, and/or opening/closing of intake and exhaust valves (not shown) associated with the cylinders 112 of the engine 102.

Figure 2:
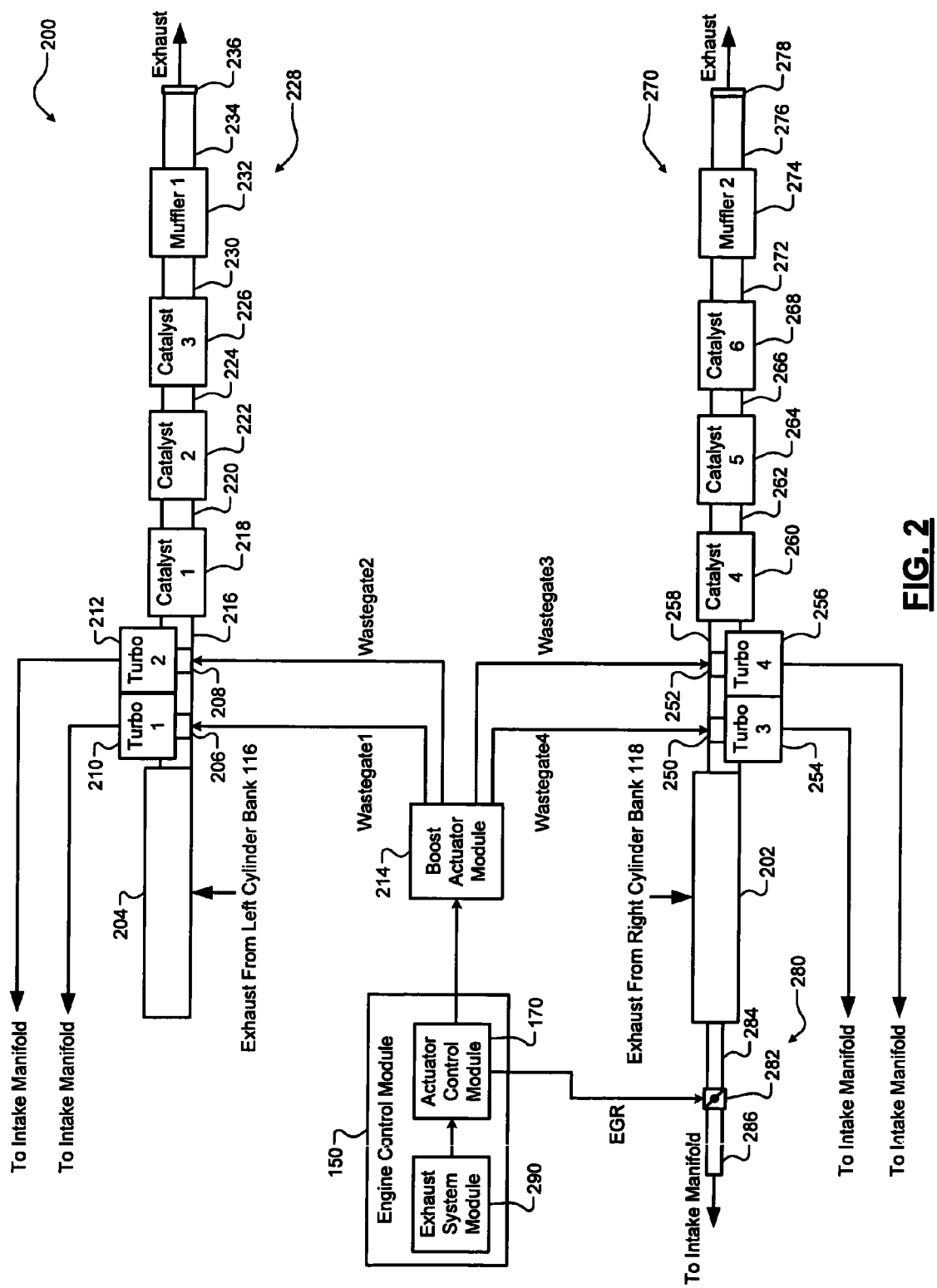
FIG. 2 is a functional block diagram of an exemplary exhaust system according to the principles of the present disclosure.

Referring now to FIG. 2, a functional block diagram of an exemplary exhaust system 200 is presented. The exemplary exhaust system 200 of FIG. 2 is a generic exhaust system including exhaust system components that are common to a plurality of different models and types of vehicles. More specifically, the generic exhaust system of FIG. 2 includes exhaust system components through which exhaust gas flows. While the exhaust system 200 will be described, the present disclosure is applicable to other exhaust system configurations, which may include a fewer or greater number components than the exhaust system 200. Numerals assigned to similar components of the exhaust system 200 are for distinction only, and are not representative of the relative importance of the components.

Exhaust gas resulting from combustion of the air/fuel mixture is expelled from the engine 102 to the exhaust system 200. More specifically, exhaust is expelled from the cylinders 112 of the right cylinder bank 118 to a right exhaust manifold 202. Exhaust is expelled from the cylinders 112 of the left cylinder bank 116 to a left exhaust manifold 204. With respect to the left exhaust manifold 204, the exhaust flows from the left exhaust manifold 204 past a first wastegate 206 and a second wastegate 208. The first and second wastegates 206 and 208 are associated with first and second turbochargers 210 and 212, respectively.

The turbochargers 210 and 212 each provide pressurized air to the intake manifold 104. The turbochargers 210 and 212 draw in air, pressurize the air, and provide the pressurized air to the intake manifold 104. The turbochargers 210 and 212 may draw in air from the intake manifold 104, ambient air, and/or another suitable source. One or more of the turbochargers 210 and 212 may be, for example only, variable geometry turbochargers.

One or more intercoolers (not shown) may also be implemented to dissipate heat from the pressurized air supplied to the intake manifold 104. The temperature of the pressurized air may be increased by, for example, the pressurization of the air and/or proximity to the exhaust system 200.

The turbochargers 210 and 212 are powered by the exhaust gas expelled from the cylinders 112 of the left cylinder bank 116. The wastegates 206 and 208 may allow the exhaust gas to bypass the turbochargers 210 and 212, respectively. In this manner, the wastegates 206 and 208 may be used to reduce the output (i.e., boost) of the turbochargers 210 and 212, respectively.

The ECM 150 controls the output of the turbochargers 210 and 212 via a boost actuator module 214. More specifically, the actuator control module 170 may control the output of the turbochargers 210 and 212. For example only, the boost actuator module 214 may modulate the output of the turbochargers 210 and 212 by controlling the positions of the wastegates 206 and 208, respectively. The boost actuator module 214 may control the positions of the wastegates 206 and 208 by controlling the duty cycle (DC) of power applied to the wastegates 206 and 208.

The exhaust from the left cylinder bank 116 may flow from the wastegates 206 and 208, through a first exhaust pipe 216, to a first catalyst 218. Exhaust pipe surface between the left exhaust manifold 204 and the wastegates 206 and 208 and/or between the wastegates 206 and 208 may also be considered as part of the first exhaust pipe 216. The first catalyst 218 may include any suitable type of catalyst. For example only, the first catalyst 218 may include a diesel oxidation catalyst (DOC), a selective catalyst reductant (SCR) catalyst, a catalytic converter, and/or any other exhaust catalyst.

The exhaust from the left cylinder bank 116 may flow from the first catalyst 218, through a second exhaust pipe 220, to a second catalyst 222. The second catalyst 222 may also include any suitable type of catalyst. For example only, the second catalyst 222 may include a diesel oxidation catalyst (DOC), a selective catalyst reductant (SCR) catalyst, a catalytic converter, and/or any other exhaust catalyst.

The exhaust from the left cylinder bank 116 may flow from the second catalyst 222, through a third exhaust pipe 224, to a third catalyst 226. The third catalyst 226 may also include any suitable type of catalyst. For example only, the third catalyst 226 may include a diesel oxidation catalyst (DOC), a selective catalyst reductant (SCR) catalyst, a catalytic converter, and/or any other exhaust catalyst. One or more of the catalysts may be implemented with another component, such as a diesel particulate filter (DPF).

In various implementations, more than one of the first, second, and third catalysts 218, 222, and 226 may be combined and implemented as a multi-stage catalyst. For example only, the first and second catalysts 218 and 222 may be implemented as a dual-stage catalyst. In other implementations, the second and third catalysts 222 and 226 may be implemented as a dual-stage catalyst, or the first, second, and third catalysts 218, 222, and 226 may all be implemented as a three-stage catalyst.

The exhaust from the left cylinder bank 116 may flow from the third catalyst 226 to a first muffler/tailpipe system 228. For example only, the first muffler/tailpipe system 228 may include a fourth exhaust pipe 230, a first muffler 232, a fifth exhaust pipe 234, and a first flapper valve 236. The exhaust may flow from the third catalyst 226, through the fourth exhaust pipe 230, to the first muffler 232.

The first muffler 232 dampens acoustic noise produced by the cylinders 112 of the left cylinder bank 116. The exhaust may flow from the first muffler 232, through the fifth exhaust pipe 234, to the first flapper valve 236. The first flapper valve 236 may increase pressure within the exhaust system 200, prevent external objects from entering the exhaust system 200, and/or perform any other function. The exhaust exits the exhaust system 200 past the first flapper valve 236.

The exhaust from the cylinders 112 of the right cylinder bank 118 may take a path similar to that of the exhaust from the cylinders 112 of the left cylinder bank 116, as described above. For example, the exhaust gas expelled from the cylinders 112 of the right cylinder bank 118 may flow from the right exhaust manifold 202 through a third wastegate 250 and a fourth wastegate 252.

The wastegates 250 and 252 are associated with third and fourth turbochargers 254 and 256, respectively. The wastegates 250 and 252 and the turbochargers 254 and 256 may be similar or identical to the wastegates 206 and 208 and the turbochargers 210 and 212, respectively. The boost actuator module 214 may control the wastegates 250 and 252 based on signals from the actuator control module 170. In this manner, the boost actuator module 214 controls the boost of the turbochargers 254 and 256.

The exhaust from the right cylinder bank 118 may flow from the wastegates 250 and 252, through a sixth exhaust pipe 258, to a fourth catalyst 260. Exhaust pipe surface between the right exhaust manifold 202 and the wastegates 250 and 252 and/or between the wastegates 250 and 252 may also be considered as part of the sixth exhaust pipe 258. The fourth catalyst 260 may include any suitable type of catalyst. For example only, the fourth catalyst 260 may include a diesel oxidation catalyst (DOC), a selective catalyst reductant (SCR) catalyst, a catalytic converter, and/or any other exhaust catalyst.

The exhaust from the right cylinder bank 118 may flow from the fourth catalyst 260, through a seventh exhaust pipe 262, to a fifth catalyst 264. The fifth catalyst 264 may also include any suitable type of catalyst. For example only, the fifth catalyst 264 may include a diesel oxidation catalyst (DOC), a selective catalyst reductant (SCR) catalyst, a catalytic converter, and/or any other exhaust catalyst.

The exhaust from the right cylinder bank 118 may flow from the fifth catalyst 264, through an eight exhaust pipe 266, to a sixth catalyst 268. The sixth catalyst 268 may also include any suitable type of catalyst. For example only, the sixth catalyst 268 may include a diesel oxidation catalyst (DOC), a selective catalyst reductant (SCR) catalyst, a catalytic converter, and/or any other exhaust catalyst. One or more of the catalysts may be implemented with another component, such as a diesel particulate filter (DPF).

In various implementations, more than one of the fourth, fifth, and sixth catalysts 260, 264, and 268 may be combined and implemented as a multi-stage catalyst. For example only, the fourth and fifth catalysts 260 and 264 may be implemented as a dual-stage catalyst. In other implementations, the fifth and sixth catalysts 264 and 268 may be implemented as a dual-stage catalyst, or the fourth, fifth, and sixth catalysts 260, 264, and 268 may all be implemented as a three-stage catalyst.

The exhaust from the right cylinder bank 118 may flow from the sixth catalyst 268 to a second muffler/tailpipe system 270. For example only, the second muffler/tailpipe system 270 may include a ninth exhaust pipe 272, a second muffler 274, a tenth exhaust pipe 276, and a second flapper valve 278. The exhaust may flow from the sixth catalyst 268, through the ninth exhaust pipe 272, to the second muffler 274.

The second muffler 274 dampens acoustic noise produced by the cylinders 112 of the right cylinder bank 118. The exhaust may flow from the second muffler 274, through the tenth exhaust pipe 276, to the second flapper valve 278. The second flapper valve 278 may increase pressure within the exhaust system 200, prevent external objects from entering the exhaust system 200, and/or perform other functions. The exhaust may exit the exhaust system 200 past the second flapper valve 278.

An exhaust gas recirculation (EGR) system 280 may also be associated with the left exhaust manifold 204 and/or the right exhaust manifold 202. For example only, the EGR system 280 may be associated with the right exhaust manifold 202, as shown in FIG. 2. The EGR system 280 includes an EGR valve 282, a first EGR pipe 284, and a second EGR pipe 286.

The EGR valve 282 is linked to the right exhaust manifold 202 via the first EGR pipe 284. The EGR valve 282 selectively redirects exhaust gas from the right exhaust manifold 202 back to the intake manifold 104 via the second EGR pipe 286. The ECM 150 controls actuation of the EGR valve 282 and, therefore, exhaust gas flowrate (EGF) through the EGR system 280. For example, the actuator control module 170 may control the opening of the EGR valve 282.

The ECM 150 includes an exhaust system module 290 that is initially configured based on the exhaust system 200 of FIG. 2. While the exhaust system module 290 and the actuator control module 170 are shown and discussed as being located within the ECM 150, the exhaust system module 290 and/or the actuator control module 170 may be located in any suitable location, such as external to the ECM 150. The exhaust system module 290 receives data that indicates the configuration of an actual exhaust system implemented in the vehicle and re-configures accordingly.

The exhaust system module 290 estimates (i.e., models) an input gas temperature, an output gas temperature, a mass temperature, and a pressure for each component of the actual exhaust system. The actuator control module 170 selectively adjusts one or more engine operating parameters based on the input gas temperature, output gas temperature, mass temperature, and/or pressure of one or more of the exhaust system components. In this manner, the actuator control module 170 may use the temperatures and/or pressure provided by the exhaust system module 290 to create desired exhaust system conditions.

Figure 3:
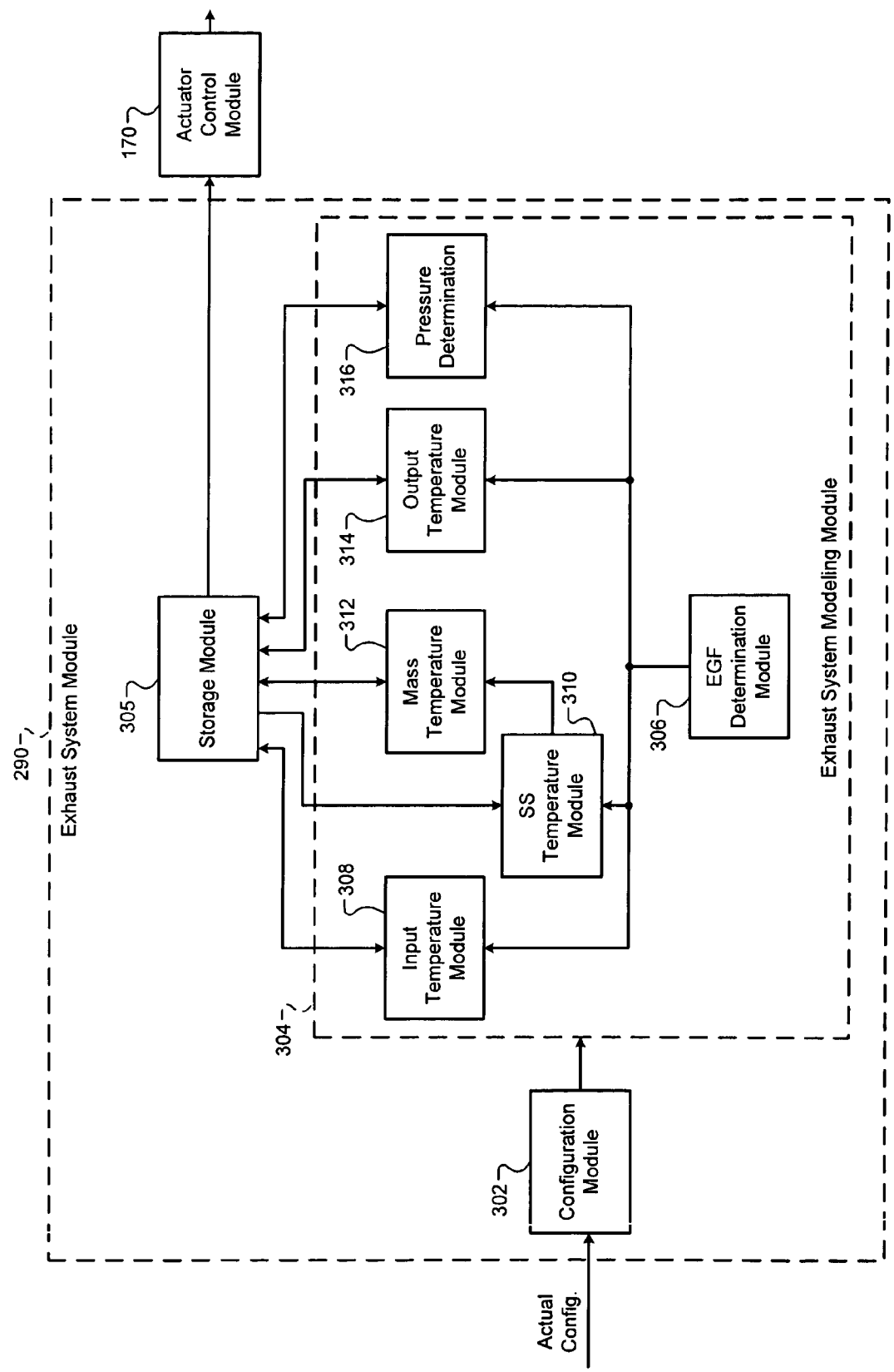
FIG. 3 is a functional block diagram of an exhaust system module according to the principles of the present disclosure.

Referring now to FIG. 3, a functional block diagram of an exemplary implementation of the exhaust system module 290 is presented. The exhaust system module 290 includes a configuration module 302, an exhaust system modeling module 304, and a storage module 305. The exhaust system modeling module 304 includes an exhaust gas flowrate (EGF) determination module 306, an input temperature module 308, a steady-state (SS) temperature module 310, a mass temperature module 312, an output temperature module 314, and a pressure determination module 316.

The exhaust system modeling module 304 is initially configured based on the exhaust system 200 of FIG. 2. In other words, the exhaust system modeling module 304 is initially configured based on a generic exhaust system that is applicable to a variety of models and types of engine systems and vehicles.

The configuration module 302 receives actual configuration data (i.e., actual config.) indicative of an actual exhaust system configuration of the vehicle in which the exhaust system module 290 is implemented. If the actual exhaust system configuration differs from the configuration of the exhaust system 200, the configuration module 302 re-configures the exhaust system modeling module 304 based on the actual configuration. Re-configuration may include, for example, enabling and disabling components of the generic configuration based on the actual configuration and/or re-configuring parameters of an enabled component based on the actual configuration. The configuration module 302 may receive the actual exhaust system configuration data from any suitable source, such as memory or a device used to calibrate the vehicle.

The exhaust system modeling module 304 models (i.e., determines) a pressure and one or more temperatures for each component of the actual exhaust system. More specifically, the exhaust system modeling module 304 models an input temperature, an output temperature, a mass temperature, and a pressure for each exhaust system component through which exhaust gas flows. The input and output temperatures of a component correspond to the temperature of the exhaust gas input to and output from the component, respectively. The mass temperature corresponds to the temperature of the material(s) that makes up the component itself.

Figure 4:
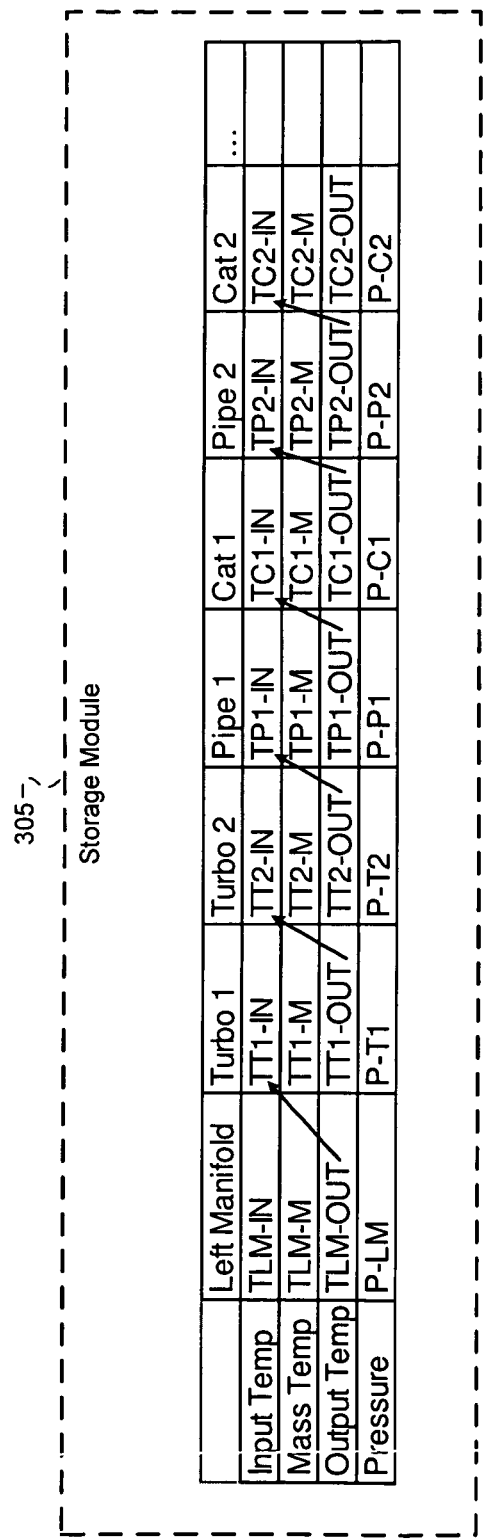
FIG. 4 is an exemplary illustration of stored temperatures and pressures of each component of an exhaust system according to the principles of the present application.

The exhaust system modeling module 304 stores the temperatures and pressure for each component of the exhaust system in the storage module 305. The storage module 305 may be implemented, for example, in memory. An exemplary illustration of the arrangement of temperatures and pressures in the storage module 305 is shown in FIG. 4.

The EGF determination module 306 determines an EGF for each component of the exhaust system. The EGF may be expressed as a percentage, relative to a maximum EGF that the associated engine is capable of producing. For example only, the EGF for a component may be determined using the equation:

$$EGF_{REL} = \frac{EGF}{EGF_{MAX}},$$

where $EGF_{REL}$ is the relative EGF for the component, EGF is the EGF through the component, and $EGF_{MAX}$ is the maximum EGF.

The EGF determination module 306 may determine the EGF for each of the exhaust system components based on various inputs. For example only, the EGF for a component may be determined based on the coolant temperature, ethanol concentration of the fuel injected, spark timing, equivalence ratio, vehicle speed, ambient air temperature, intake air temperature, and the accelerator position. The EGF for the component may also be determined based on the EGR flowrate, MAF, air-per-cylinder (APC), ambient air pressure, engine speed, flapper valve position(s), and/or the waste gate duty cycles.

The EGF determination module 306 may also determine the EGF for the component based on the mode of operation of the engine 102. For example only, the EGF may be determined based on whether one or more of the cylinders 112 are deactivated, whether the engine 102 is idling, whether the engine 102 is running or shutdown (e.g., hybrid applications), and/or whether the fuel for each firing event is being injected in one or more pulses (e.g., two pulses).

If one or more cylinders are deactivated, the EGF for the component may be determined based on the number of deactivated and/or activated cylinders. The EGF may be determined based on the period of time that the engine 102 has been shutdown (i.e., OFF) when the engine is shutdown. The EGF determination module 306 may also determine the EGF for the component based on various exhaust system modes, such as whether air is being injected into the exhaust system (e.g., by an auxiliary air pump), whether catalyst warmup is occurring, and/or whether light-off is occurring within one or more catalysts of the exhaust system.

The EGF determination module 306 may also determine the EGF for the component based on the actual configuration of the exhaust system and/or characteristics of the various components. For example only, the exhaust system may be configured as to bring together the exhaust gas from the right and left exhaust manifolds 202 and 204 at a confluence point (not shown). The EGF determination module 306 may sum the two EGFs of upstream components for the components downstream of the confluence point. Characteristics that may affect the EGF may include, for example, curvature and/or cross sectional area.

The input temperature module 308 models (i.e., determines) the input temperature (i.e., input gas temperature) for each of the components of the actual exhaust system. The input temperature module 308 stores the input temperatures in the storage module 305. The input temperature module 308 may set the input temperature for a component based on the output temperature of the preceding (i.e., upstream) component of the exhaust system. For example only, the input temperature module 308 may set the input temperature for an N-th component of the exhaust system based on the output temperature of an (N−1)-th component.

For an exhaust manifold (e.g., the right and left exhaust manifolds 202 and 204) the input temperature module 308 may set the input temperatures based on an engine output temperature. The input temperature module 308 may determine the engine output temperature based on various parameters, such as the engine load, the APC, the engine speed, the spark timing, the equivalence ratio, the ethanol concentration of the fuel, the vehicle speed, and/or the warmup state of the engine 102.

When the exhaust system includes an EGR system (e.g., the EGR system 280), the input temperature module 308 determines an input temperature for the EGR system based on a temperature of the exhaust gas at the point where the EGR system connects to the associated exhaust manifold. The input temperature module 308 may also determine input temperature for each component of the EGR system, such as the two EGR lines and/or the EGR valve.

The SS temperature module 310 models (i.e., determines) an SS temperature for each component of the actual exhaust system. The SS temperature for a component corresponds to a temperature that the component itself will reach if the engine load conditions remain constant (i.e., steady state). The SS temperature module 310 determines the SS temperature for the component based on the input temperature of the component, the ambient temperature, and a SS coefficient determined for the component.

The SS temperature module 310 determines the SS coefficient for the component based on the EGF for the component. For example only, the SS temperature module 310 may determine the SS temperature for the component using the equation:

$$T_{SS}=(T_{IN}-T_A)*C_{SS},$$

where $T_{SS}$ is the SS temperature of the component, $T_{IN}$ is the input temperature of the component, $T_A$ is the ambient air temperature, and $C_{SS}$ is the SS coefficient for the component.

The SS temperature module 310 determines the SS coefficient for a turbocharger (e.g., the turbochargers 212, 212, 254, and/or 256) based on the EGF for the turbochargers and the DC of power applied to the associated wastegate. For example only, the SS temperature module 310 may determine the SS coefficient for the turbocharger 212 based on the EGF for the turbocharger 212 and the DC of power applied to the wastegate 206.

As the turbocharger draws in ambient air, the SS temperature module 310 also adjusts the SS temperature for the turbocharger based on the intake air temperature. For example only, the SS temperature module 310 may determine the SS temperature for the turbocharger using the equation:

$$T_{SS\text{-}T}=IAT+C_{SS\text{-}T}*(T_{IN\text{-}T}-IAT),$$

where $T_{SS\text{-}T}$ is the SS temperature of the turbocharger, IAT is the intake air temperature, $C_{SS\text{-}T}$ is the SS coefficient for the turbocharger, and $T_{IN\text{-}T}$ is the input temperature for the turbocharger.

The mass temperature module 312 determines a mass temperature for each of the exhaust system components. The mass temperature module 312 stores the mass temperatures in the storage module 305. The mass temperature module 312 determines the mass temperature for a component based on the SS temperature of the component and a mass coefficient determined for the component. The mass temperature corresponds to the temperature of the material (e.g., the metal) that makes up the component.

The mass temperature module 312 determines the mass coefficient for the component based on the EGF determined for the component. The mass coefficient corresponds to the rate at which the mass temperature is changing toward the SS temperature of the component. For example only, the mass coefficient may increase as the EGF decreases. The mass temperature module 312 determines the mass temperature for the component based on, for example, a product of the SS temperature and the mass coefficient.

The mass temperature module 312 determines the mass coefficient for a turbocharger (e.g., the turbochargers 212, 212, 254, and/or 256) based on the EGF for the turbochargers and the DC of power applied to the associated wastegate. For example only, the mass temperature module 312 may determine the mass coefficient for the turbocharger 212 based on the EGF for the turbocharger 212 and the DC of power applied to the wastegate 206.

The output temperature module 314 determines an output temperature (i.e., an output gas temperature) for each of the exhaust system components. The output temperature module 314 stores the output temperatures in the storage module 305.

The output temperature module 314 determines the output temperature for a component based on the input temperature for the component, the mass temperature of the component, and an output coefficient for the component. The output temperature module 314 determines the output temperature for the component based in the input temperature of the component plus or minus the change in temperature attributable to heat transfer between the component and air passing the component. More specifically, the output temperature module 314 determines the output temperature by adjusting the input temperature toward the mass temperature based on the output coefficient.

The output temperature module 314 determines the output coefficient for the component based on the EGF of the component. For example only, the output temperature module 314 may determine the output temperature for the component using the equation:

$$T_{OUT} = T_{IN} + (T_{IN} - T_{MASS}) * C_{OUT},$$

where $T_{OUT}$ is the output temperature of the component, $T_{IN}$ is the input temperature of the component, $T_{MASS}$ is the mass temperature of the component, and $C_{OUT}$ is the output coefficient of the component.

Catalysts of the exhaust system, such as the catalysts 218, 222, 226, 260, 264, and 268 may also produce heat. Accordingly, the output temperature module 314 increases the output temperature of a catalyst of the exhaust system based on the heat generated by the catalyst. The SS temperature module 310 and the mass temperature module 312 may also increase the SS temperature and the mass temperature of the catalyst, respectively, based on the heat generated by the catalyst.

The amount of heat generated by the catalyst will be referred to as a heat generation term. The heat generation term for the catalyst may be determined based on the EGF of the catalyst, the equivalence ratio, and/or the ethanol concentration of the fuel. For example only, when the equivalence ratio is 1.0 (i.e., when a stoichiometric air/fuel mixture being combusted), the heat generation term may be negligible. The heat generation term for the catalyst may also be determined based on whether an air is being supplied into the whether air is being injected into the exhaust system (e.g., by an auxiliary air pump) and/or whether the fuel for each firing event is being injected in one or more pulses (e.g., two pulses).

The output temperature module 314 determines the output coefficient for a turbocharger (e.g., the turbochargers 212, 212, 254, and/or 256) based on the EGF for the turbochargers and the DC of power applied to the associated wastegate. The output temperature module 314 determines the output coefficient for the turbocharger 212 based on the EGF for the turbocharger 212 and the DC of power applied to the wastegate 206. For example only, the output temperature module 314 may determine the output temperature for the turbocharger using the equation:

$$T_{OUT\text{-}T} = T_{IN\text{-}T} + C_{OUT\text{-}T} * (T_{M\text{-}T} - T_{IN\text{-}T}),$$

where $T_{OUT\text{-}T}$ is the output temperature of the turbocharger, $T_{IN\text{-}T}$ is the input temperature for the turbocharger, $C_{OUT\text{-}T}$ is the output coefficient for the turbocharger, and $T_{M\text{-}T}$ is the mass temperature for the turbocharger.

The pressure determination module 316 determines a pressure for each of the exhaust system components. The pressure determination module 316 stores the pressures in the storage module 305. The pressure determination module 316 starts from the ambient air pressure (i.e., barometric pressure) and determines the pressure for a last component of the actual exhaust system. The last component corresponds to the last component that the exhaust gas passes through before being expelled from the exhaust system.

The pressure determination module 316 may determine the pressure for a component based on a pressure increase(s) for each successive component of the exhaust system moving upstream, toward the associated exhaust manifold(s). In this manner, the pressure of the associated exhaust manifold will be a greatest pressure. For example only, the last component of the exhaust system may include a muffler/tailpipe system, such as one of the muffler/tailpipe systems 228 or 270. The pressure determination module 316 may determine the pressure for the muffler/tailpipe systems 228 and 270, then the pressure of the exhaust pipes 230 and 272, then the catalysts 226 and 268, etc.

The pressure determination module 316 determines the pressure increase for a component based on the EGF of the component. The pressure determination module 316 may also determine the pressure increase for the component based on the EGF of attached components, and/or characteristics of the component, such as curvature and/or changes in cross-sectional area of the component. For muffler/tailpipe systems (e.g., the muffler tailpipe systems 228 and 280) the pressure determination module 316 determines the pressure increase based on the EGF for the muffler/tailpipe system and the position of an associated flapper valve (if present).

The pressure determination module 316 determines the pressure increase for a turbocharger (e.g., the turbochargers 210, 212, 254, and 256) based on the EGF for the turbocharger and the DC of power applied to the associated wastegate. For example only, the pressure determination module 316 determines the pressure increase for the turbocharger 210 based on the EGF for the turbocharger 210 and the DC of power applied to the wastegate 206.

The pressure determination module 316 determines the pressure for an EGR system (e.g., the EGR system 280) based on an EGR flowrate. The EGR flowrate may be expressed as a percentage, relative to a maximum EGR flowrate. The maximum EGR flowrate may be a calibrated value and may be retrieved from memory. The EGR flowrate may be determined based on the EGR position, the MAP, and/or the pressure of the associated manifolds.

The actuator control module 170 selectively adjusts one or more engine operating parameters based on the parameters stored in the storage module 305. More specifically, the actuator control module 170 selectively adjusts one or more engine parameters based on the temperatures and/or pressure of one or more of the components of the actual exhaust system. For example only, the actuator control module 170 may adjust the amount of fuel injected, airflow into the engine 102, and/or the spark timing based on one or more of the pressures and temperatures stored in the storage module 305.

Figure 5:
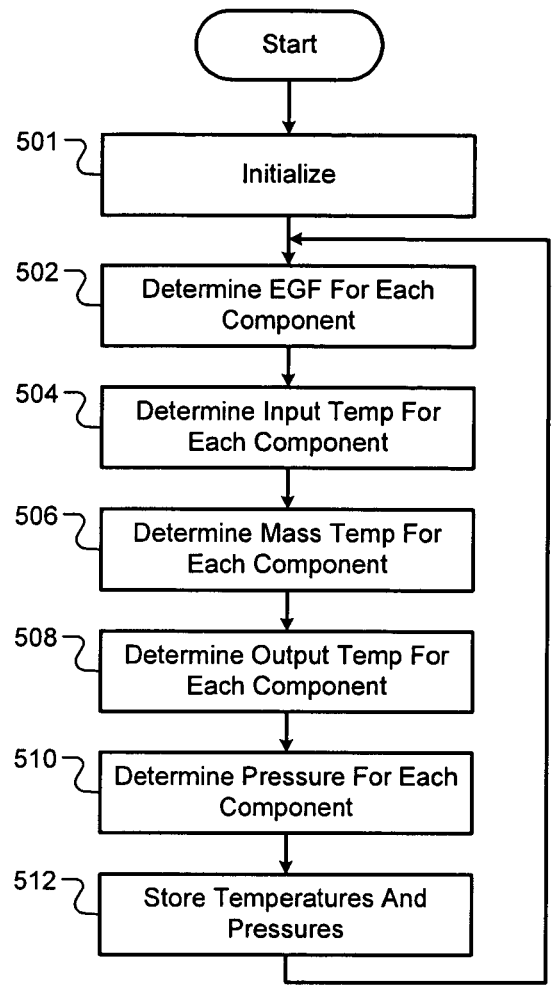
FIG. 5 is a flowchart depicting exemplary steps performed by the exhaust system module according to the principles of the present disclosure.

Referring now to FIG. 5, a flowchart depicting exemplary steps performed by the exhaust system module 290 is presented. Control begins in step 501 where control initializes. For example only, control may reset previously stored values and/or configure the exhaust system modeling module 304 in step 501. Control configures the exhaust system modeling module 304 based on the actual exhaust system configuration of the vehicle.

Control determines an EGF for each component of an exhaust system in step 502. Control continues to step 504 where control determines an input temperature for each component of the exhaust system. The input temperature for a component corresponds to the temperature of gas entering the component.

In step 506, control determines a mass temperature for each component of the exhaust system. Control determines the mass temperature of a component based on a SS temperature determined for the component, as discussed above. The mass temperature of a component corresponds to the temperature of the material (e.g., metal) that makes up the component. The SS temperature of the component corresponds to a temperature that the material will reach if the engine load conditions remain constant (i.e., steady state). Control determines an output temperature for each component in step 508. The output temperature for a component corresponds to the temperature of gas output from the component.

Control continues to step 510 where control determines a pressure for each component. Control stores the temperatures and pressures in step 512, and control returns to step 502. Control stores the temperatures and pressures in, for example, the storage module 305. In this manner, the storage module 305 includes an input temperature, a mass temperature, an output temperature, and a pressure modeled for each of the components of the exhaust system.

Figure 6A:
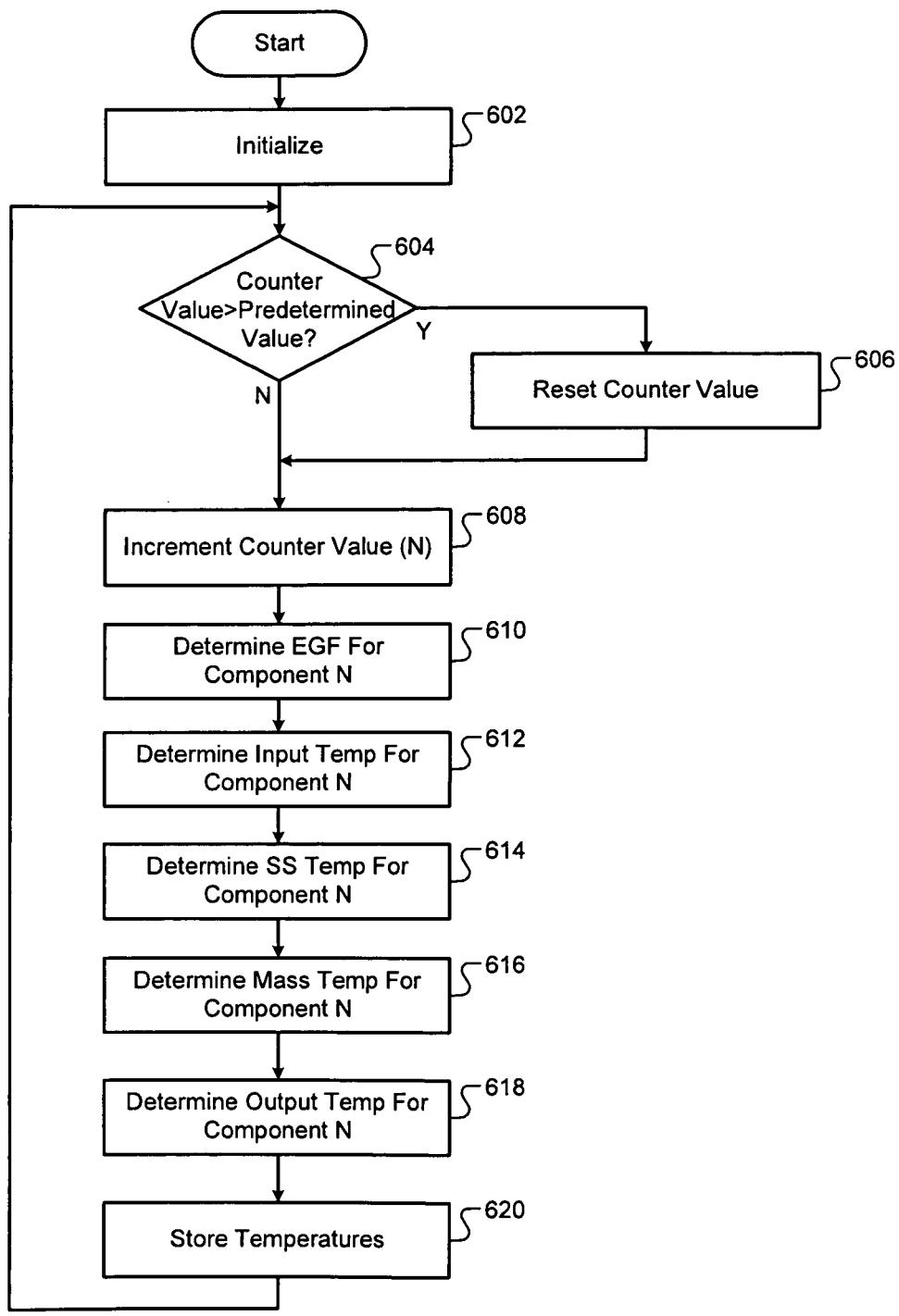
FIGS. 6A-6B are flowcharts depicting another set of exemplary steps performed by the exhaust system module according to the principles of the present disclosure.

Referring now to FIG. 6A, a flowchart depicting another set of exemplary steps performed by the exhaust system module 290 is presented. Control initializes in step 602. For example only, control may reset previously stored values and/or configure the exhaust system modeling module 304 in step 602. Control configures the exhaust system modeling module 304 based on the actual exhaust system configuration of the vehicle. Control may also reset a counter value (i.e., N value) to a predetermined reset value in step 602. The predetermined reset value may be set to, for example only, zero.

In step 604, control determines whether the counter value is greater than a predetermined value (i.e., M value). If true, control transfers to step 606. If false, control continues to step 608. Control resets the counter value in step 606. The predetermined value (i.e., M) corresponds to a total number of components included in the exhaust system. In this manner, control resets the counter value when the counter value exceeds the total number of components of the exhaust system. Control resets the counter value to the predetermined reset value, and control continues to step 608.

Control increments the counter value in step 608. In other words, control increments the N value. In step 610, control determines the EGF for the component of the exhaust system that corresponds to the N value. For example only, an N value of 1 may correspond to an associated exhaust manifold and an N value of M may correspond to an associated muffler/tailpipe system.

Control determines the input temperature for the component in step 612. The input temperature corresponds to the temperature of gas entering the component. Control determines the SS temperature for the component in step 614. The SS temperature corresponds to the temperature that the material of the component will likely reach if the engine load conditions remain constant.

In step 616, control determines the mass temperature for the component. The mass temperature corresponds to the temperature of the material of the component. Control continues in step 618 where control determines the output temperature for the component. The output temperature corresponds to the temperature of gas output from the component. Control stores the temperatures in step 620, and control returns to step 604. The temperatures may be stored in, for example, the storage module 305.

Figure 6B:
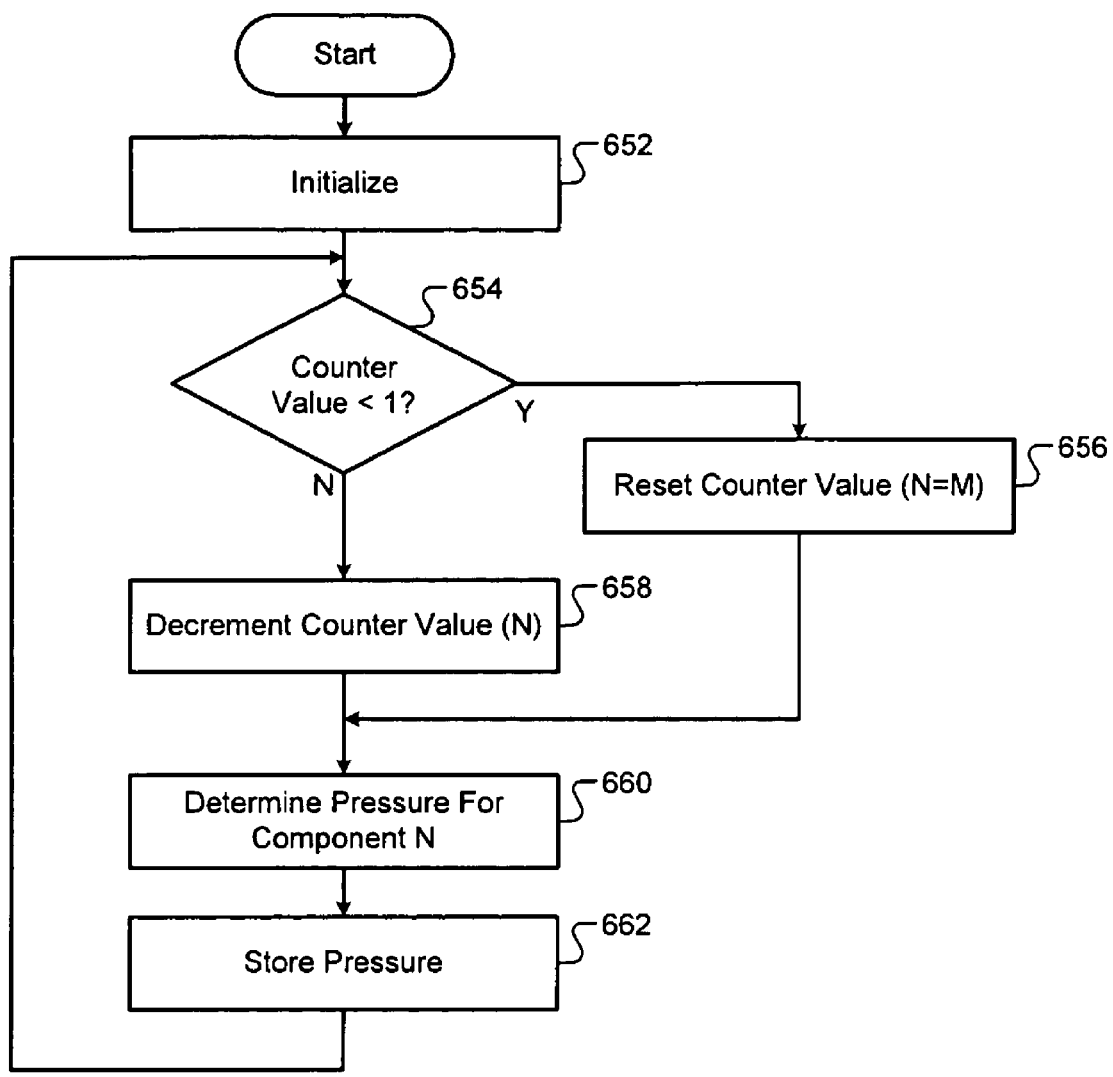

Referring now to FIG. 6B, a flowchart depicting exemplary steps performed by the exhaust system module 290 is presented. Control may perform some or all of the steps of FIG. 6B in addition to the steps shown in FIG. 6A. Control initializes in step 652. For example only, control may reset previously stored values and/or configure the exhaust system modeling module 304 in step 652. Control configures the exhaust system modeling module 304 based on the actual exhaust system configuration of the vehicle.

Control may also reset a counter value (i.e., an N value) to a predetermined reset value (i.e., an M value) in step 652. The predetermined reset value may be set to, for example only, the total number of components of the exhaust system. In this manner, control begins at the last component of the exhaust system, such as a muffler/tailpipe system.

In step 654, control determines whether the counter value is less than 1. If true, control transfers to step 656. If false, control continues to step 658. In step 656, control resets the counter value (i.e., the N value). Control resets the counter value to the predetermined reset value (i.e., the M value). In this manner, control resets the counter value to the total number of components of the exhaust system. Control then continues to step 660.

Control decrements the counter value in step 658, and control continues to step 660. In step 660, control determines the pressure for the component corresponding to the N value. Control stores the pressure in step 662, and control returns to step 654. The pressure may be stored in, for example, the storage module 305.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust control system for a vehicle, comprising:
an exhaust system modeling module that estimates an input gas temperature, an output gas temperature, a mass temperature, and a pressure for an exhaust system component of an exhaust system implemented in said vehicle, wherein exhaust gas flows through said exhaust system component; and
an actuator control module that selectively adjusts an engine operating parameter based on at least one of said input gas temperature, said output gas temperature, said mass temperature, and said pressure.

2. The exhaust control system of claim 1 wherein said exhaust system modeling module estimates said input gas temperature based on a second output gas temperature that is estimated for a second exhaust system component that is linked to and located upstream from said exhaust system component.

3. The exhaust control system of claim 1 wherein said exhaust system modeling module estimates an engine output temperature and estimates said input gas temperature based on said engine output temperature when said exhaust system component is an exhaust manifold.

4. The exhaust control system of claim 3 wherein said exhaust system modeling module estimates said engine output temperature based on engine load, air-per-cylinder, spark timing, equivalence ratio, ethanol concentration of fuel, engine speed, and vehicle speed.

5. The exhaust control system of claim 1 wherein said exhaust system modeling module estimates a gas temperature at a location where an exhaust gas recirculation (EGR) system is connected to an exhaust manifold and estimates said input gas temperature based on said gas temperature when said exhaust system component is an EGR system.

6. The exhaust control system of claim 1 wherein said exhaust system modeling module estimates a steady-state (SS) temperature for said exhaust system component and estimates said mass temperature based on said SS temperature and a mass coefficient determined for said exhaust system component.

7. The exhaust control system of claim 6 wherein said mass coefficient is determined based on an exhaust gas flowrate (EGF) estimated for said exhaust system component.

8. The exhaust control system of claim 7 wherein said exhaust system modeling module estimates said SS temperature based on ambient air temperature, said input gas temperature, and said EGF.

9. The exhaust control system of claim 8 wherein said exhaust system modeling module estimates said SS temperature further based on an intake air temperature and a duty cycle of power applied to a bypass when said exhaust system component is a turbocharger.

10. The exhaust control system of claim 6 wherein said exhaust system modeling module estimates heat generation when said exhaust system component is a catalyst and selectively increases at least one of said mass temperature and said SS temperature based on said heat generation.

11. The exhaust control system of claim 1 wherein said exhaust system modeling module estimates said output gas temperature based on said input gas temperature, said mass temperature, and an output coefficient determined for said exhaust system component.

12. The exhaust control system of claim 11 wherein said output coefficient is determined based on an exhaust gas flowrate (EGF) estimated for said exhaust system component.

13. The exhaust control system of claim 12 wherein said exhaust system modeling module estimates heat generation when said exhaust system component is a catalyst and selectively increases said output gas temperature based on said heat generation.

14. The exhaust control system of claim 12 wherein said output coefficient is determined further based on a duty cycle of power applied to a bypass when said exhaust system component is a turbocharger.

15. The exhaust control system of claim 1 wherein said exhaust system modeling module estimates said pressure based on a sum of a pressure increase estimated for said exhaust system component and a second pressure downstream of said pressure.

16. The exhaust control system of claim 15 wherein said exhaust system modeling module estimates said pressure increase based on an exhaust gas flowrate (EGF) estimated for said exhaust system component.

17. The exhaust control system of claim 16 wherein said exhaust system modeling module estimates said pressure increase further based on a duty cycle of power applied to a bypass when said exhaust system component is a turbocharger.

18. The exhaust control system of claim 15 wherein said second pressure is ambient air pressure when said exhaust system component is a muffler/tailpipe system.

19. The exhaust control system of claim 1 further comprising a configuration module that receives configuration data corresponding to a configuration of said exhaust system and that configures said exhaust system modeling module based on said configuration data.

20. The exhaust control system of claim 19 wherein said exhaust system modeling module is initially configured based on a generic exhaust system configuration including two exhaust manifolds, an exhaust gas recirculation (EGR) system, four turbochargers, six exhaust pipe sections, six catalysts, and two muffler/tailpipe systems.

21. The exhaust control system of claim 20 wherein said exhaust system modeling module selectively disables one or more components of said generic exhaust system configuration based on said configuration data.

22. The exhaust control system of claim 1 wherein said an exhaust system modeling module that estimates N input gas temperatures, output gas temperatures, mass temperatures, and pressures for respective ones of N different exhaust system components including said exhaust system component, wherein N is an integer greater than one, and wherein said exhaust gas flows through each of said N different exhaust system components.

23. The exhaust control system of claim 22 wherein said exhaust system includes a total of said N different exhaust system components.

* * * * *